Aug. 22, 1944.   G. E. ROEDDING   2,356,432
PRISMOIDAL REAR VIEW MIRROR
Filed Feb. 24, 1941

Inventor
Gordon E. Roedding
By Blackmore, Spencer & Flint
Attorneys

Patented Aug. 22, 1944

2,356,432

UNITED STATES PATENT OFFICE 2,356,432

PRISMOIDAL REARVIEW MIRROR

Gordon E. Roedding, Madison County, Ind., assignor to General Motors Corporation, Detroit, Mich., a corporation of Delaware Application February 24, 1941, Serial No. 380,175

6 Claims. (Cl. 88—77)

This invention has to do with mirrors which include a reflector with a transparent low efficiency reflecting surface disposed in front of and at a small angle to a high efficiency reflecting surface so that by tilting the reflector slightly an observer can bring to his eyes either a dim or a bright image of the same object.

The principal object of the invention is to provide a mirror of this type in which the mount for the reflector, which preferably includes, in addition to a hinge, means for swinging the reflector from one to the other of the mentioned positions and holding it in the last mentioned position upon initiation of movement in the proper direction, is concealed from view and the mirror as a whole is of pleasing appearance.

Another object of the invention is to provide a mirror of the type described in which the reflector is so mounted that the movement necessary to shift one image out of and the other into the observer's eyes is minimized and that only initiation of movement in the proper direction is required to tilt the reflector from one position to the other and hold it in the last mentioned position.

For a better understanding of the nature and objects of this invention, reference is made to the following specification wherein there is described the preferred embodiment of the invention which is illustrated in the accompanying drawing.

Figure 1:
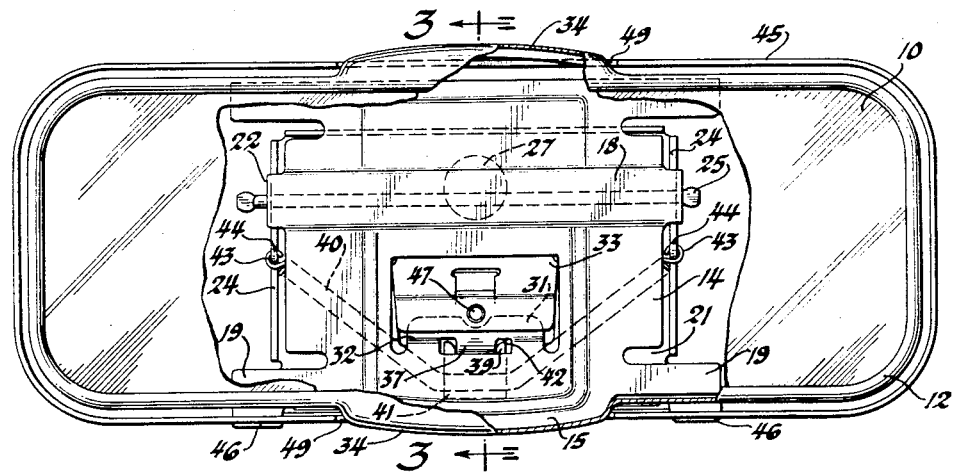
Figure 1 is a front elevation, with parts broken away and in section, of a rear view mirror for an automotive vehicle in accordance with my invention.
Figure 2:
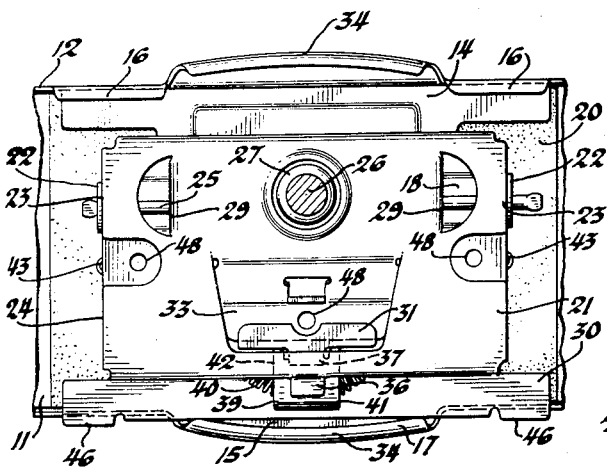
Figure 2 is a rear elevation of a portion of the mirror with the housing removed.
Figure 3:
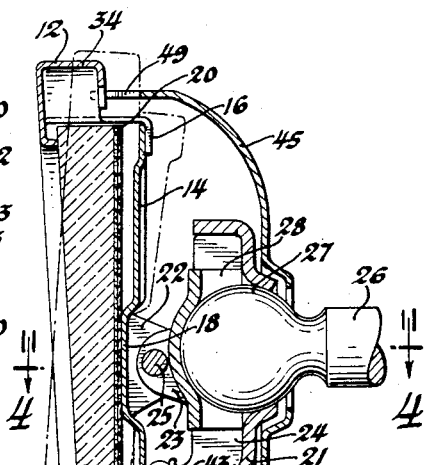
Figure 3 is an enlarged section taken on the line 3—3 of Figure 1.
Figure 4:
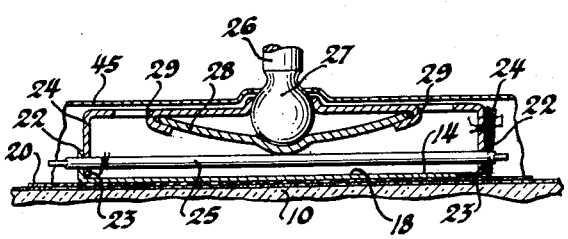
Figure 4 is a fragmentary section taken as indicated by the line 4—4 of Figure 3 but on the same scale as Figures 1 and 2.

In the drawing the reference character 10 indicates a reflector which consists of a generally rectangular plate of glass or other suitable material with flat front and rear surfaces disposed vertically at such an angle to each other, e. g., about 3½°, as to separate the images from the front and rear surfaces sufficiently that at the distance of the driver's eyes from the mirror only one of them at a time is perceptible. The front surface of the reflector 10 is highly polished but bare but the rear surface thereof is coated with silver or some other suitable material 11 of high light reflecting efficiency.

Around the reflector 10 extends a frame 12 on an inturned flange 13 on whose front face the margins of the front surface of the reflector are seated. The reflector is held in place in the frame by a backing plate 14 of which the upper margin and a wing 15 on the lower edge underlie flanges 16 and 17 on the back of the frame which has enough give in it to enable the flanges to be sprung over the upper margin and the wing. The backing plate has a horizontally extending embossment 18 about two-thirds the way up from its lower to its upper edge and laterally extending spring fingers 19 near its lower edge which bear against the rear surface of the reflector through the intermediary of a thin piece of cardboard 20. Thus the reflector 10 is resiliently held between the flange 13 on the front face of the frame 12 and the backing plate 14.

So that the reflector assembly 10—12—14 may be tilted from a position in which a dim image from the front surface of the reflector to a position in which a bright image of the same object from the rear surface of the reflector strikes the eyes of the driver and vice versa, the reflector assembly is hinged to a mounting plate 21. The hinge is formed by ears 22 on the backing plate 14 at the ends of the embossment 18, ears 23 on flanges 24 on the side edges of the mounting plate and a pintle 25 which extends through the ears 22 and 23. To facilitate movement by the driver of the reflector assembly from one to the other of the mentioned positions wing-like projections 34 are formed in the upper and lower rails of the frame 12.

To provide for mounting the mirror in a vehicle so that it may be adjusted to position it properly for different drivers, there is provided an arm 26 which extends through the mounting plate 21 and has on its inner end a ball 27 which is frictionally clamped between parti-spherical seats in the mounting plate and a spring strap 28 whose ends are engaged under tongues 29 struck out from the mounting plate.

Movement on the hinge 22—23—25 of the lower part of the reflector assembly toward the mounting plate is limited by engagement of the lower margin of the backing plate with an offset 30 in the lower margin of the mounting plate. Movement on the hinge of the lower part of the backing plate away from the mounting plate is limited by engagement of a flange 31 on a tongue 32 struck out from the backing plate with a tongue 33 struck out from the mounting plate. The elements which limit the movement of the reflector assembly on the hinge 22—23—25 are so disposed that the angle through which the reflector assembly swings in moving from one to the other of its limits is just that necessary to shift the image from one out of and the image from the other of the reflecting surfaces into the driver's eyes. The location of the pintle 25 close to the rear surface and in the neighborhood of the middle of the reflector 10 vertically, of course, minimizes the movement of the top and bottom of the reflector assembly necessary to tilt it through the requisite angle.

In the section which joins the offset 30 to the body of the mounting plate 21, there is provided an elongated opening 35 and from the mounting plate at the middle of the opening and parallel to the offset, there projects an offset tongue 36. From the flange 31 on the tongue 32 which is struck out from the backing plate 14, there projects downwardly a tongue 37 with an arched lip 38 on its lower end. The crest of the arch is so located that when the reflector assembly 10—12—14 is shifted from one of its limits to the other the crest moves from one side to the other of the plane in which lie the axis of the pintle 25 and the parallel axis of the opening 35.

To shift the reflector assembly 10 on the hinge 22—23—25 from one of its limits to the other and hold it in either position upon initiation of movement in the proper direction by the driver there is provided a toggle piece 39 and a coiled spring 40. The toggle piece, which consists of a strip of metal formed to provide an elongated eye 41 with a notched wing 42 projecting from it, extends through the opening 35 in the mounting plate with the eye bearing at one side against the offset 30 and at the other against the offset tongue 36 on the mounting plate and the notch in the wing straddling and seated against the underside of the arched lip on the tongue 37 on the backing plate. The coiled spring 40 is threaded through the eye 41 of the toggle piece and has on its ends eyes 43 which are hooked over prongs 44 which project from the flanges 24 on the mounting plate.

The coiled spring 40 pulls the wing 42 on the toggle piece 39 tightly up against the underside of the arched lip 38 on the tongue 37. Consequently, when the reflector assembly 10—12—14 is shifted from one of its limits to the other the outer end of the wing swings across the plane in which lie the axis of the pintle 25 and the parallel axis of the opening 35. When the outer end of the wing is on either side of this plane the coiled spring acting through it urges the reflector assembly toward the limit of its movement in that direction. Consequently, upon initiation by the driver of movement of the reflector assembly from one of its limits to the other the coiled spring will complete the movement and thereafter hold the assembly in its new position. The force necessary to initiate movement of the reflector assembly from one of its limits to the other is insufficient to move the mounting plate on the ball 27 and, consequently, mere initiation of movement of the reflector assembly by the driver serves to shift the dim image out of and the bright image from the reflector 10 into his eyes or vice versa.

To conceal the mounting and backing plates 14 and 21 and associated parts and give the mirror a finished and pleasing appearance there is provided a generally tray-like housing 45 which is similar in contour to the reflector assembly 10—12—14 without the wing-like projections 34. The "bottom" of the housing 45 is seated against the rear side of the mounting plate with the side and end walls thereof extending forwardly and ears 46 on the lower edge of the mounting plate extending through slots in the lower side wall of the housing. The housing is secured to the mounting plate by a screw 47 and two other screws (not shown) which are threaded into openings 48 in the mounting plate. The housing 45 is made sufficiently deep and sufficiently longer and wider than the reflector assembly that except opposite the wing-like projections 34 its side and end walls extend forwardly well beyond the rear edge of the frame 12 of the reflector assembly with enough clearance to permit the requisite tilting movement of the reflector assembly on the hinge 22—23—25. The wing-like projections 34 project beyond the upper and lower side walls of the housing through notches 49 in the latter which are sufficiently deep to permit the requisite tilting movement of the reflector assembly 10—12—14.

I claim:

1. In a mirror, a housing with an open side, a member which includes a transparent low efficiency reflecting surface disposed in front of and at a small angle to a high efficiency reflecting surface in the open side of the housing, and means within the housing through which the member is mounted so that the member may swing about an axis close to its inner surface and in the neighborhood of its middle from a position in which a dim image from the low efficiency reflecting surface to a position in which a bright image from the high efficiency reflecting surface is directed into the eyes of an observer and vice versa.

2. In a mirror, a housing with an open side, a member which includes a transparent low efficiency reflecting surface disposed in front of and at a small angle to a high efficiency reflecting surface in the open side of the housing, means within the housing through which the member is mounted so that the member may swing about an axis close to its inner surface and in the neighborhood of its middle from a position in which a dim image from the low efficiency reflecting surface to a position in which a bright image from the high efficiency reflecting surface is directed into the eyes of an observer and vice versa, and means within the housing for swinging the member from one to the other of the mentioned positions and holding it in the last mentioned position upon initiation of movement in the proper direction.

3. In a mirror, a housing with an open side, a supporting member within the housing and secured to the side thereof opposite the open side, a member which includes a transparent low efficiency reflecting surface disposed in front of and at a small angle to a high efficiency reflecting surface in the open side of the housing, a member which carries the second specified member and is mounted on the supporting member so that the third specified member may swing about an axis close to its inner surface and in the neighborhood of its middle from a position in which a dim image from the low efficiency reflecting surface to a position in which a bright image from the high efficiency reflecting surface is directed into the eyes of an observer and vice versa.

4. In a mirror, a housing with an open side, a mounting plate within the housing and secured to the side thereof opposite the open side, a member which includes a transparent low efficiency reflecting surface disposed in front of and at a small angle to a high efficiency reflecting surface in the open side of the housing, a frame around the specified member, a backing plate by which the specified member is held in the frame mounted to rock on the mounting plate about an axis close to its inner surface and in the neighborhood of its middle from a position in which a dim image from the low efficiency reflecting surface to a position in which a bright image from the high efficiency reflecting surface is directed into the eyes of an observer and vice versa, and means for swinging the backing plate fom one to the other of the mentioned positions and holding it in the last mentioned position upon initiation of movement in the proper direction.

5. In a mirror, a mounting plate, a member which includes a transparent low efficiency reflecting surface disposed in front of and at a small angle to a high efficiency reflecting surface, a backing plate on the specified member mounted to rock on the mounting plate so that the backing plate may swing from a position in which a dim image from the low efficiency reflecting surface to a position in which a bright image from the high efficiency reflecting surface is directed into the eyes of an observer and vice versa, an offset in each of the plates positioned to engage the other plate to prevent the backing plate swinging beyond the mentioned positions, a toggle piece fulcrumed between the offset in and the body of one of the plates with one of its ends seated against the offset in the other plate so that it swings from one side to the other of the plane in which lie the axis about which the backing plate rocks on the mounting plate and the axis on which the toggle piece is fulcrumed when the backing plate swings from one to the other of the mentioned positions, and a spring connected to the toggle piece for swinging the backing plate from one to the other of the mentioned positions and holding it in the last mentioned position upon initiation of movement in the proper direction.

6. In a mirror, a housing with an open side, a supporting member within the housing and secured to the side thereof opposite the open side, a member which includes a transparent low efficiency reflecting surface disposed in front of and at a small angle to a high efficiency reflecting surface in the open side of the housing, a member which carries the second specified member and is mounted on the supporting member so that the third specified member may swing from a position in which a dim image from the low efficiency reflecting surface to a position in which a bright image from the high efficiency reflecting surface is directed into the eyes of an observer and vice versa, and an arm which extends from within to without the housing through the side thereof opposite the open side and is connected to the supporting member so that it may be moved angularly with respect thereto.

GORDON E. ROEDDING.